United States Patent
Choo et al.

(10) Patent No.: US 12,003,719 B2
(45) Date of Patent: Jun. 4, 2024

(54) METHOD, APPARATUS AND STORAGE MEDIUM FOR IMAGE ENCODING/DECODING USING SEGMENTATION MAP

(71) Applicant: ELECTRONICS AND TELECOMMUNICATIONS RESEARCH INSTITUTE, Daejeon (KR)

(72) Inventors: Hyon-Gon Choo, Daejeon (KR); Hee-Kyung Lee, Daejeon (KR); Han-Shin Lim, Daejeon (KR); Jeong-Il Seo, Daejeon (KR); Won-Sik Cheong, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 178 days.

(21) Appl. No.: 17/534,770

(22) Filed: Nov. 24, 2021

(65) Prior Publication Data
US 2022/0166976 A1  May 26, 2022

(30) Foreign Application Priority Data

Nov. 26, 2020  (KR) .......................... 10-2020-0161718
Nov. 23, 2021  (KR) .......................... 10-2021-0162477

(51) Int. Cl.
*H04N 19/119* (2014.01)
*G06T 7/11* (2017.01)
(Continued)

(52) U.S. Cl.
CPC .............. *H04N 19/119* (2014.11); *G06T 7/11* (2017.01); *G06T 7/40* (2013.01); *G06T 7/90* (2017.01);
(Continued)

(58) Field of Classification Search
CPC .. H04N 19/119; H04N 19/136; H04N 19/176; H04N 19/186; H04N 19/46;
(Continued)

(56) References Cited

U.S. PATENT DOCUMENTS 9,924,161 B2 *  3/2018  Wilkins ................ H04N 19/523
2005/0117019 A1 *  6/2005  Lamboray .............. H04N 19/20
                                              348/E13.062
(Continued)

FOREIGN PATENT DOCUMENTS

EP         2338278 B1 *  2/2015  .......... G06F 3/0481
KR    10-2020-0000543        1/2020
KR    10-2020-0115001       10/2020

*Primary Examiner* — Francis Geroleo
(74) *Attorney, Agent, or Firm* — KILE PARK REED & HOUTTEMAN

(57) ABSTRACT

Disclosed herein are a method, an apparatus and a storage medium for image encoding/decoding using a segmentation map. A feature vector for an image may be extracted using a segmentation map. The image may be encoded using the segmentation map and the feature vector. An output stream from an encoding apparatus may include a video stream and a feature stream. An input stream to a decoding apparatus may include a video stream and a feature stream. The image may be reconstructed using a reconstructed segmentation map and a reconstructed feature vector.

14 Claims, 23 Drawing Sheets

(51) Int. Cl.
*G06T 7/40* (2017.01)
*G06T 7/90* (2017.01)
*H04N 19/136* (2014.01)
*H04N 19/176* (2014.01)
*H04N 19/186* (2014.01)
*H04N 19/46* (2014.01)
*H04N 19/80* (2014.01)

(52) U.S. Cl.
CPC ......... *H04N 19/136* (2014.11); *H04N 19/176* (2014.11); *H04N 19/186* (2014.11); *H04N 19/46* (2014.11); *H04N 19/80* (2014.11); *G06T 2207/10016* (2013.01)

(58) Field of Classification Search
CPC ........ H04N 19/80; H04N 19/12; H04N 19/85; H04N 19/17; G06T 7/11; G06T 7/40; G06T 7/90; G06T 2207/10016
See application file for complete search history.

(56) References Cited

U.S. PATENT DOCUMENTS

| | | | |
|---|---|---|---|
| 2010/0061444 A1* | 3/2010 | Wilkins | H04N 19/21 375/E7.076 |
| 2018/0131946 A1 | 5/2018 | Lee et al. | |
| 2019/0279075 A1* | 9/2019 | Liu | G06N 3/045 |
| 2020/0202128 A1* | 6/2020 | Liu | G06V 20/35 |
| 2020/0302291 A1 | 9/2020 | Hong | |
| 2020/0311874 A1 | 10/2020 | Ye et al. | |
| 2021/0021823 A1 | 1/2021 | Na et al. | |
| 2021/0358164 A1* | 11/2021 | Liu | G06V 10/764 |
| 2021/0382497 A1* | 12/2021 | Zhi | G06T 7/73 |
| 2022/0156943 A1* | 5/2022 | Zhang | G06V 10/82 |

* cited by examiner

ORIGINAL IMAGE

SEGMENTATION MAP

RECONSTRUCTED IMAGE GENERATED BY
GENERAL IMAGE TRANSLATION NETWORK

RECONSTRUCTED IMAGE GENERATED USING
COLOR FEATURE VECTOR

METHOD, APPARATUS AND STORAGE MEDIUM FOR IMAGE ENCODING/DECODING USING SEGMENTATION MAP

CROSS REFERENCE TO RELATED APPLICATIONS

This application claims the benefit of Korean Patent Application Nos. 10-2020-0161718, filed Nov. 26, 2020 and 10-2021-0162477, filed Nov. 23, 2021, which are hereby incorporated by reference in their entireties into this application.

BACKGROUND OF THE INVENTION

1. Technical Field

The present disclosure relates generally to a method, an apparatus, and a storage medium for image encoding/decoding. More particularly, the present disclosure relates to a method, an apparatus and a storage medium for image encoding/decoding using a segmentation map.

2. Description of the Related Art

With the development of artificial intelligence technology and an increase in the number of Internet of Things (IoT) devices, traffic between machines has greatly increased, and image analysis dependent on machines has come to be widely used.

Existing image compression methods for media are designed to efficiently perform compression by sufficiently considering human visual properties.

Image compression technology may predict an image to be output (or a block in the image) using previously processed information.

Such image compression technology may derive a residual image between a predicted image and an image to be output, and may transmit and/or receive a compressed residual image. The compressed residual image may be generated by applying an energy transform function, such as a Discrete Cosine Transform (DCT), and entropy coding to the residual image.

In other words, image compression technology is technology related to a method for minimizing the difference between an input image and an output image.

Image compression technology based on deep learning may be configured to input an image that is the target of compression to a deep neural network, extract a hidden vector from the image using a repetitive or a collective scheme, and encode the extracted hidden vector.

In order to improve image compression efficiency, a deep neural network performs learning so that an encoded hidden vector can be represented by a smaller number of bits while improving the quality of a reconstructed image. For such image compression, compression technology based on an autoencoder may be used.

SUMMARY OF THE INVENTION

An embodiment is intended to provide an apparatus, a method, and a storage medium that perform encoding and/or decoding on an image using a segmentation map.

An embodiment is intended to provide an apparatus, a method, and a storage medium that perform encoding and/or decoding on an image using feature information generated based on a segmentation map.

An embodiment is intended to provide an apparatus, a method, and a storage medium that perform encoding and/or decoding on an image using a residual image between a reconstructed image and an input image.

In accordance with an aspect, there is provided an encoding method, including generating a segmentation map image indicating a segmentation map of an input image; and generating a feature vector using the input image and the segmentation map image.

The segmentation map may be a region segmentation map indicating one or more regions of the input image.

Information about a label of each object in the segmentation map image and a feature of the object may be extracted.

The feature may include color and/or texture information of the object.

The feature of the object may include one or more blocks.

Each of the one or more blocks may include position and color set.

The color may be a representative color component of the corresponding block.

The feature vector may include color map information.

The color map information may include pieces of color information of each of one or more objects in the input image.

The pieces of color information may be pieces of color information of one or more blocks forming each object in the input image.

The encoding method may further include generating a video stream including an encoded segmentation map image; generating a feature stream including an encoded feature vector; and generating an output stream by performing multiplexing on the video stream and the feature stream.

The encoded segmentation map image may be generated by encoding the segmentation map image.

The encoded feature vector may be generated by encoding the feature vector.

The encoding method may further include generating a reconstructed image using the segmentation map image and the feature vector; generating a residual image between the reconstructed image and the input image; and generating an encoded residual image by encoding the residual image.

The output stream may include a residual stream.

The residual stream may include the encoded residual image.

A filter may be applied to the input image to generate the segmentation map.

There may be provided a computer-readable storage medium, including a bitstream generated by the encoding method.

In accordance with another aspect, there is provided a decoding method, including generating a segmentation map image; generating a feature vector; and generating a reconstructed image using the segmentation map image and the feature vector.

The reconstructed image may be generated by a generator network for performing an image translation method based on deep learning.

The segmentation map image may be reconstructed by decoding an encoded segmentation map image.

The feature vector may be reconstructed by decoding an encoded feature vector.

The decoding method may further include separating a video stream and a feature stream from an input stream by performing demultiplexing on the input stream.

The video stream may include the encoded segmentation map image.

The feature stream may include the encoded feature vector.

Information about a label of each object in the segmentation map image and a feature of the object may be extracted.

The feature may include color and/or texture information of the object.

The decoding method may further include generating a final image using the reconstructed image and a residual image.

A residual stream may be output from the input stream.

The residual image may be reconstructed by decoding an encoded residual image of the residual stream.

In accordance with a further aspect, there is provided a computer-readable storage medium storing a bitstream for image decoding, wherein the bitstream includes a video stream; and a feature stream, wherein the video stream and the feature stream are separated from the bitstream by performing demultiplexing on the bitstream, a segmentation map image is generated using the video stream, a feature vector is generated using the feature stream, and a reconstructed image is generated using the segmentation map image and the feature stream.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
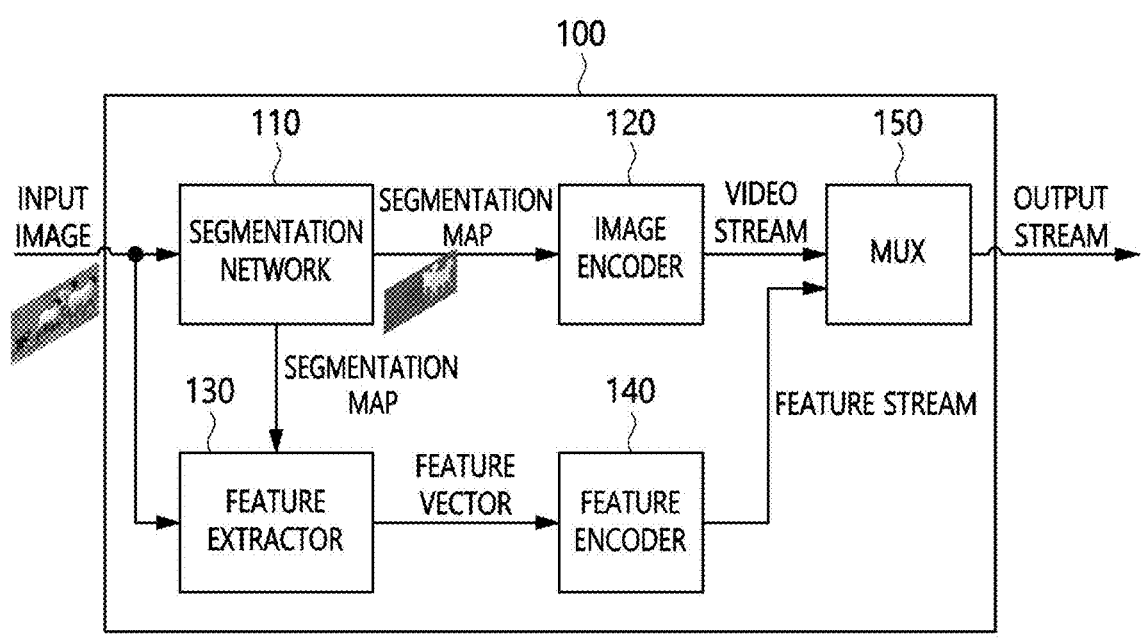
FIG. 1 illustrates the configuration of an encoding apparatus according to an embodiment.

The present disclosure may have various changes and various embodiments, and specific embodiments will be illustrated in the attached drawings and described in detail below. However, this is not intended to limit the present disclosure to particular modes of practice, and it is to be appreciated that all changes, equivalents, and substitutes that do not depart from the spirit or technical scope of the present disclosure are encompassed in the present disclosure.

Detailed descriptions of the following exemplary embodiments will be made with reference to the attached drawings illustrating specific embodiments. These embodiments are described so that those having ordinary knowledge in the technical field to which the present disclosure pertains can easily practice the embodiments. It should be noted that the various embodiments are different from each other, but are not necessarily mutually exclusive from each other. For example, specific shapes, structures, and characteristics described herein may be implemented as other embodiments without departing from the spirit and scope of the embodiments in relation to an embodiment. Further, it should be understood that the locations or arrangement of individual components in each disclosed embodiment can be changed without departing from the spirit and scope of the embodiments. Therefore, the accompanying detailed description is not intended to restrict the scope of the disclosure, and the scope of the exemplary embodiments is limited only by the accompanying claims, along with equivalents thereof, as long as they are appropriately described.

In the drawings, similar reference numerals are used to designate the same or similar functions in various aspects. The shapes, sizes, etc. of components in the drawings may be exaggerated to make the description clear.

In the present disclosure, it will be understood that, although the terms "first", "second", etc. may be used herein to describe various components, these components should not be limited by these terms. These terms are only used to distinguish one component from other components. For instance, a first component discussed below could be termed a second component without departing from the teachings of the present disclosure. Similarly, a second component could also be termed a first component. The term "and/or" includes any and all combinations of one or more of the associated listed items.

It will be understood that when a component is referred to as being "connected" or "coupled" to another component, it can be directly connected or coupled to the other component, or intervening components may be present. In contrast, it should be understood that when a component is referred to as being "directly coupled" or "directly connected" to another component, there are no intervening component present.

The components described in the embodiments are independently shown in order to indicate different characteristic functions, but this does not mean that each of the components is formed of a separate piece of hardware or software. That is, components are arranged and included separately for convenience of description. For example, at least two of the components may be integrated into a single component. Conversely, one component may be divided into multiple components. An embodiment into which the components are integrated or an embodiment in which some components are separated is included in the scope of the present specification, as long as it does not depart from the essence of the present specification.

The terms used in embodiments are merely used to describe specific embodiments and are not intended to limit the present disclosure. A singular expression includes a plural expression unless a description to the contrary is specifically pointed out in context. In the embodiments, it should be understood that terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added. That is, it should be noted that, in embodiments, an expression describing that a component "comprises" a specific component means that additional components may be included in the scope of the practice or the technical spirit of the embodiments, but do not preclude the presence of components other than the specific component.

In embodiments, the term "at least one" means one of numbers of 1 or more, such as 1, 2, 3, and 4. In the embodiments, the term "a plurality of" means one of numbers of 2 or more, such as 2, 3, or 4.

Some components in embodiments are not essential components for performing essential functions, but may be optional components for improving only performance. The embodiments may be implemented using only essential components for implementing the essence of the embodiments. For example, a structure including only essential components, excluding optional components used only to improve performance, is also included in the scope of the embodiments.

Embodiments of the present disclosure are described with reference to the accompanying drawings in order to describe the present disclosure in detail so that those having ordinary knowledge in the technical field to which the present disclosure pertains can easily practice the present disclosure. In the following description of the present disclosure, detailed descriptions of known functions and configurations which are deemed to make the gist of the present disclosure obscure will be omitted. It should be noted that the same reference numerals are used to designate the same or similar components throughout the drawings, and that descriptions of the same components will be omitted.

Hereinafter, an image may be one of pictures forming a video, or may be a video itself. For example, "encoding and/or decoding of an image" may mean "encoding and/or decoding of a video", or may mean "encoding and/or decoding of one of images forming a video".

Hereinafter, the terms "video" and "motion picture(s)" may be used to have the same meaning, and may be used interchangeably with each other.

Hereinafter, a target image may be an encoding target image that is the target to be encoded and/or a decoding target image that is the target to be decoded. Further, the target image may be an input image that is input to an encoding apparatus or an input image that is input to a decoding apparatus. Further, the target image may be a current image that is the target to be currently encoded and/or decoded. For example, the terms "target image" and "current image" may be used to have the same meaning, and may be used interchangeably with each other.

Hereinafter, the terms "image", "picture", "frame", and "screen" may be used to have the same meaning, and may be used interchangeably with each other.

Hereinafter, a target block may be an encoding target block that is the target to be encoded and/or a decoding target block that is the target to be decoded. Further, the target block may be a current block that is the target to be currently encoded and/or decoded. For example, the terms "target block" and "current block" may be used to have the same meaning, and may be used interchangeably with each other. A current block may be an encoding target block that is the target to be encoded during encoding and/or a decoding target block that is the target to be decoded during decoding. Also, the current block may be at least one of a coding block, a prediction block, a residual block, and a transform block.

Hereinafter, the terms "block" and "unit" may be used to have the same meaning, and may be used interchangeably with each other. Alternatively, the term "block" may refer to a specific unit.

Hereinafter, the terms "region" and "segment" may be used interchangeably with each other.

In embodiments, each of specific information, data, a flag, an index, an element, an attribute, etc. may have a value. The value "0" of information, data, a flag, an index, an element, an attribute, etc. may indicate false, logical false, or a first predefined value. In other words, the value "0", false, logical false, and the first predefined value may be used interchangeably with each other. The value "1" of information, data, a flag, an index, an element, an attribute, etc. may indicate true, logical true, or a second predefined value. In other words, the value "1", true, logical true, and the second predefined value may be used interchangeably with each other.

When a variable such as i or j is used to indicate a row, a column, or an index, the value of i may be an integer of 0 or more, or an integer of 1 or more. In other words, in embodiments, a row, a column, an index, etc. may be counted from 0, or may be counted from 1.

In embodiments, the term "one or more" and the term "at least one" may have the same meaning as the term "a plurality of". The term "one or more" or the term "at least one" may be used interchangeably with the term "a plurality of".

Characteristics required for an application such as a machine vision may be different from those required for an application for a video perceived (viewed) by a person. Therefore, the development of a new concept of coding technology for image communication between machines is required. For example, technology for an application such as face recognition may require a design of compression technology that desirably maintains features required for face recognition.

Semantic-Based Segmentation Map Generation Technology (Semantic Segmentation Map)

The purpose of semantic image segmentation is to classify all pixels in a picture into (a predefined number of) corresponding classes.

Semantic image segmentation may be a method for classifying each of all pixels in an image into predefined classes depending on previously learned information and displaying the results of classification as an image.

Deep-Learning-Based Image Translation Technology (Image-to-Image Translation)

Deep-learning-based image translation technology may be technology for predicting the content of an output image from an input image depending on previously learned information.

In deep-learning-based image translation technology, datasets may be composed of two groups of unpaired input and target images When learning is performed such that images in two groups are mapped to each other, a resulting image corresponding to the input image may be acquired.

Generally, because a generative neural network for image translation are designed to generate various types of resulting images may for the one input image.

However, in relation to image reconstruction, a problem may arise in that the features of the generated output by deep-learning-based image translation technology cannot identically represent the features of an original image. An image generated from map information input to a neural network may have a structure similar to that of an original image, but an image generated from the map information may have a difference in color, shape, or the like from the original image. Due to this problem, it may be difficult to use the deep-learning-based image translation technology for reconstruction of an image without change.

In the following embodiments, described is an image compression method that is capable of providing high compression efficiency while maintaining the performance of a machine vision using properties required for the machine vision, rather than human visual properties. The image compression method may use segmentation map generation technology and image translation technology.

FIG. 1 illustrates the configuration of an encoding apparatus according to an embodiment.

An encoding apparatus 100 may include a segmentation network 110, an image encoder 120, a feature extractor 130, a feature encoder 140, and a multiplexer (MUX) 150.

In FIG. 1, the name of input to a component of the encoding apparatus 100 and the name of output from a component thereof are depicted, and an image indicating the input of the encoding apparatus 100 is also depicted.

The functions and operations of components of the encoding apparatus 100 will be described in detail below with reference to FIG. 2.

Figure 2:
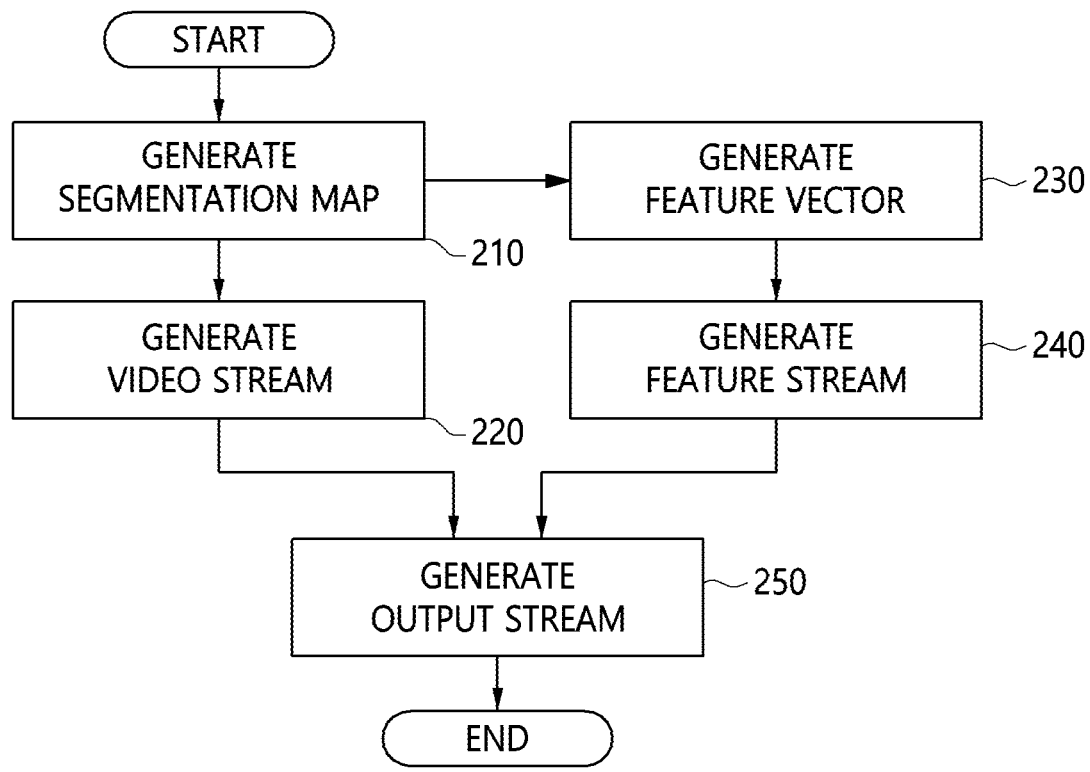
FIG. 2 is a flowchart of an encoding method according to an embodiment.

FIG. 2 is a flowchart of an encoding method according to an embodiment.

A computer-readable storage medium including a video stream, which will be described later, may be generated by the encoding method. The video stream may be a bitstream.

At step 210, the segmentation network 110 may receive an input image of an input video. The segmentation network 110 may generate a segmentation map of the input image.

The input image may be an original image.

The segmentation map may be a region segmentation map indicating one or more regions of the input image.

The one or more regions may respectively correspond to one or more objects. Here, the object may mean a specific object itself existing in the image, or may mean a pixel or block including all or at least a part of the object, and such an interpretation may be equally applied in embodiments to be described later.

The segmentation map may be represented by an image having a two-dimensional (2D) shape.

The segmentation network 110 may generate a segmentation map image indicating the segmentation map of the input image. Hereinafter, the terms "segmentation map" and "segmentation map image" may be used to have the same meaning, and may be used interchangeably with each other.

At step 220, the image encoder 120 may encode the segmentation map image, and may then generate an encoded segmentation map image. The image encoder 120 may generate a video stream including the encoded segmentation map image sequences.

At step 230, the feature extractor 130 may receive the input image of the input video.

The feature extractor 130 may receive information about the segmentation map image from the segmentation network 110.

The feature extractor 130 may extract features from at least one of the input image and the segmentation map image.

The feature extractor 130 may extract, for each of one or more objects in the segmentation map image, at least one of information about the label of the corresponding object and the feature of the object. Here, the feature of each object may include the color, texture, etc. of the corresponding object.

The feature extractor 130 may generate a feature vector using at least one of the input image and the segmentation map image.

For example, the feature vector may include one or more features for one or more objects. Alternatively, the feature vector may indicate one or more features.

For example, the identifier (ID) and the class of each object may be set. For example, the class of each object may be a sheep or a dog. At least one of the identifier and the class of the object may be set for each type of object pre-defined in the above-described encoding apparatus 100. Here, the type of the object may be an object classification criterion at a higher concept. At least one of one or more identifiers and one or more classes may be defined for one type. Also, ranges of values that identifiers of pre-defined types may have may be the same or different. For example, 0 to m identifiers may be defined for a first type and a second type, and 0 to n identifiers may be defined for a third type. Through these definitions, even when objects have the same identifier, it may be possible to identify an object in consideration of a type of the object.

For example, the features may include 1) position(s), 2) shape(s) (e.g. contour, etc), 3) texture(s) (e.g., head, hair, tail, etc.), and 4) color(s) (e.g., white, black, brown, RGB (255, 255, 0), etc.).

The feature vector may have a configuration such as that shown in the following Table 1.

TABLE 1

| Identifier (ID): 1 |
| --- |
| Class: Sheep |
| Features |
| Position |
| Shape Contour |
| Texture (Head/Hair) |
| Color (White/Black) |

TABLE 1-continued

Identifier (ID): 2

Class: Dog
Features
Position
Shape contour
Texture (Head/Tail)
Color (White, Black, Brown)

The feature vector may include more than one thumbnail images which illustrates objects.

The feature vector may be represented by a small amount of data such as metadata.

At step 240, the feature encoder 140 may encode the feature vector, and may then generate an encoded feature vector. The feature encoder 140 may generate a feature stream including the encoded feature vector.

At step 250, the MUX 150 may generate an output stream by performing multiplexing on the video stream and the feature stream.

In an embodiment, the image may include a plurality of images. At least of the above-described segmentation map image, encoded segmentation map image, feature, feature vector, and encoded feature vector may be generated for each of the plurality of images. Alternatively, at least of the above-described segmentation map image, the encoded segmentation map image, the feature, the feature vector, and the encoded feature vector may be generated only for some of the plurality of images, and may be shared for remaining images.

The video stream may include a plurality of encoded segmentation map images for the plurality of images. The feature stream may include encoded feature vectors for the plurality of images.

Figure 3:
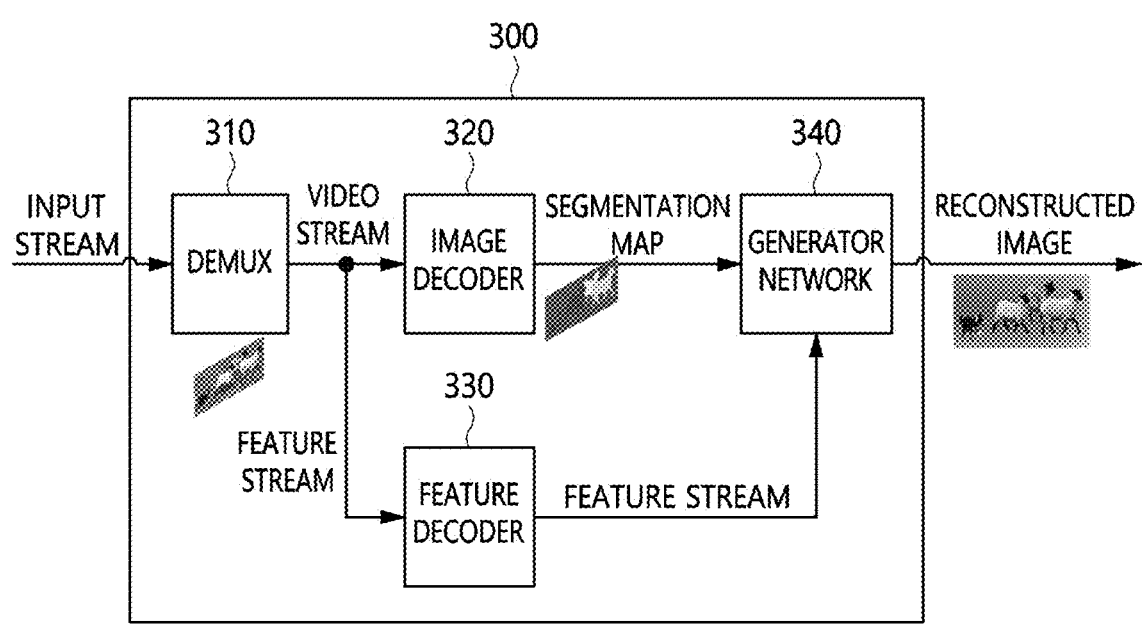
FIG. 3 illustrates the configuration of a decoding apparatus according to an embodiment.

FIG. 3 illustrates the configuration of a decoding apparatus according to an embodiment.

A decoding apparatus 300 may include a demultiplexer (DEMUX) 310, an image decoder 320, a feature decoder 330, and a generator network 340.

In FIG. 3, the name of input to the component of the decoding apparatus 300 and the name of output from the component thereof are depicted, and an image indicating the output of the decoding apparatus 300 is depicted.

The functions and operations of components of the decoding apparatus 300 will be described in detail below with reference to FIG. 4.

Figure 4:
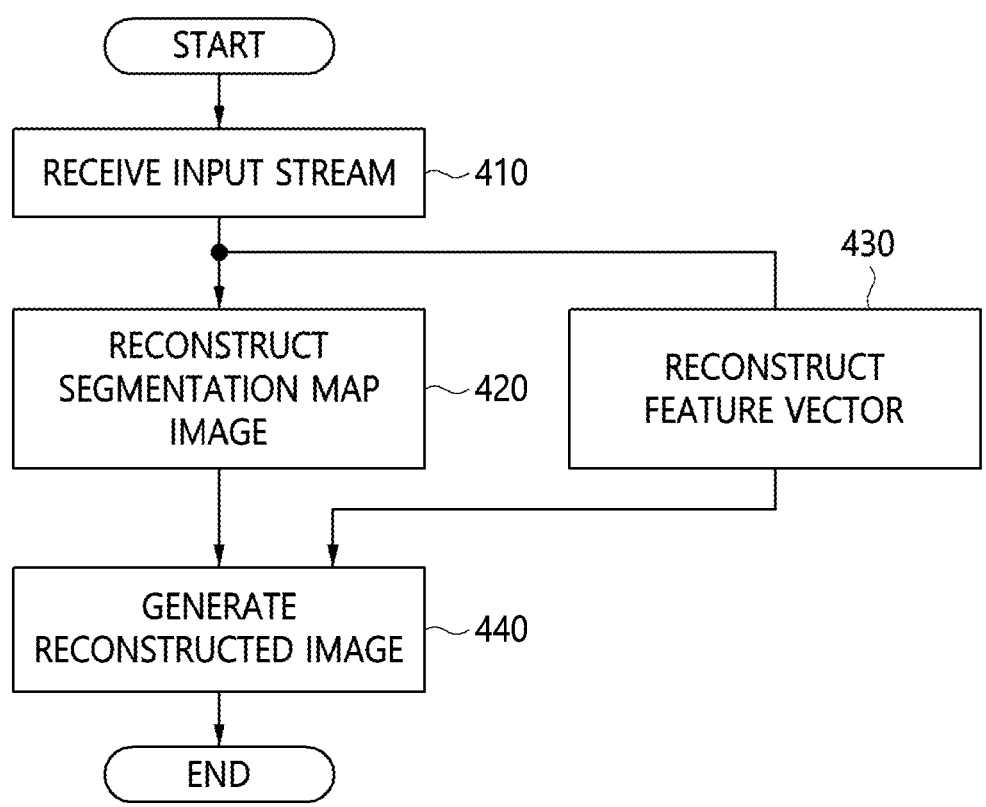
FIG. 4 is a flowchart of a decoding method according to an embodiment.

FIG. 4 is a flowchart of a decoding method according to an embodiment.

At step 410, the DEMUX 310 may acquire an input stream.

The input stream may be a bitstream stored in a computer-readable storage medium so as to perform image decoding.

The input stream may be an output stream provided from the encoding apparatus 100, described above with reference to step 250. The DEMUX 310 may receive the input stream from the encoding apparatus 100. The input stream may be defined as a single stream that is a combination of a video stream and a feature stream. Alternatively, the video stream and the feature stream may be received separately from each other.

The DEMUX 310 may separate a video stream and a feature stream from the input stream by performing demultiplexing on the input stream, and may output the video stream and the feature stream from the input stream.

The video stream may be input to the image decoder 320 corresponding to the image encoder 120 of the encoding apparatus 100.

The feature stream may be input to the feature decoder 330 corresponding to the feature encoder 140 of the encoding apparatus 100.

At step 420, the image decoder 320 may decode an encoded segmentation map image of the video stream, and may then reconstruct a segmentation map image.

At step 430, the feature decoder 330 may decode an encoded feature vector of the feature stream, and may then reconstruct a feature vector.

The (reconstructed) segmentation map image and the (reconstructed) feature vector may be input to the generator network 340.

At step 440, the generator network 340 may generate a reconstructed image using the (reconstructed) segmentation map image and the (reconstructed) feature vector.

Information about the label of each object in the (reconstructed) segmentation map image and the feature of the object may be extracted, and the feature may include the color of the object, the texture of the object, etc.

The generator network 340 may perform an image translation method based on deep learning. The generator network 340 may be an image translation network.

The generator network 340 may be a network for providing output generated based on the feature vector by utilizing the feature vector (or a feature vector represented by an image) as the input of an image translation method based on deep learning.

Figure 5:
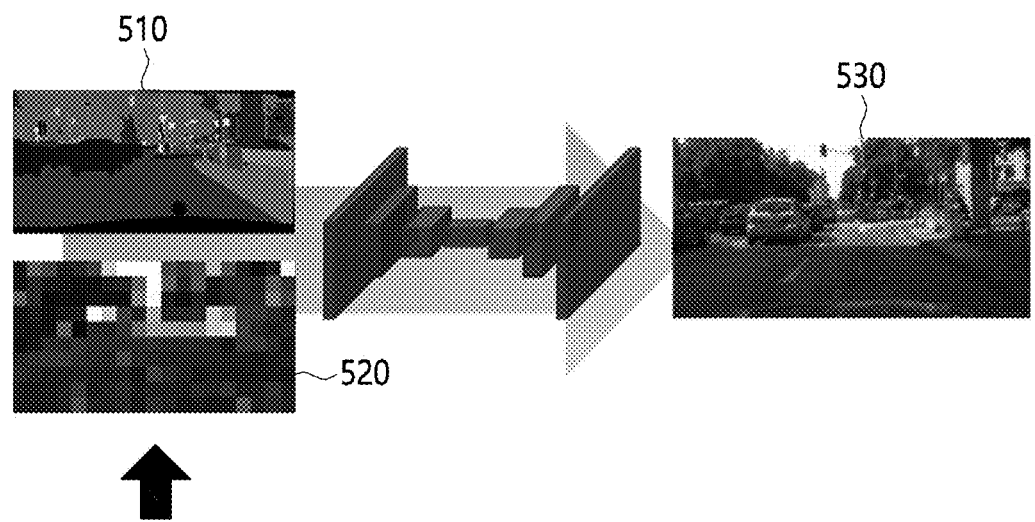
FIG. 5 illustrates the generation of a reconstructed image according to an example.

FIG. 5 illustrates the generation of a reconstructed image according to an example.

In FIG. 5, a segmentation map image 510, a feature vector 520 represented by an image, and a reconstructed image 530 are illustrated.

For example, at least of the identifier (ID) and the class of the corresponding object may be set. For example, the class of the object may be a car. Also, as described above, the type of the object may be set separately. At least one of the identifier and the class of the object may be set respectively in consideration of the type.

For example, the feature of the object may include one or more blocks. Each of the one or more blocks may include position and color set (for example, 1) one or more positions and 2) one or more colors). The color may be a representative color component of the block.

Alternatively, the feature vector of the object may indicate one or more features. Each of the one or more features may represent a block. The block may include position and color set (for example, 1) one or more positions and 2) one or more colors).

A feature may represent a representative color component of each of one or more blocks forming an image. Alternatively, the feature vector may represent representative color components of one or more blocks forming the image. In image encoding and decoding, a representative color component of each block of the image may be used as a feature.

For an input image, color information corresponding to the unit of an object may be generated. Here, the color information may be generated in units of a block having a specific size. For example, the specific size may be N×M. Here, N and M may be an integer of 1, 2, 4, 8, 16, 32, 64 or more, respectively. N and M may be the same as or different from each other.

Alternatively, for each of one or more objects in the input image, color information of the corresponding object may be generated. Further, the color information may be generated for each of one or more blocks forming each object. The one or more blocks may have a specific size. For example, the specific size may be N×M.

When the color information is generated, color map information for the color information may be generated. The color map information may include pieces of color information of each of one or more objects in the input image. The pieces of color information of each object may be pieces of color information of one or more blocks forming each object in the input image.

The above-described feature vector may be color map information. Alternatively, the feature vector may include color map information. Alternatively, the above-described feature vector may be a color feature vector.

The generator network 340 may generate a reconstructed image using the segmentation map image and the color map information.

The reconstructed image generated by the generator network 340 may be closer to the original image than a reconstructed image generated by a general image translation network.

Figure 8:
FIG. 8 illustrates a reconstructed image generated by a general image translation network according to an example.
Figure 9:
FIG. 9 illustrates a reconstructed image generated using a color feature vector according to an example.

For example, as shown in the results of FIGS. 8 and 9, when there is information about a car in the segmentation map, a conventional image translation network may generate a car having any color (for example, gray or black, etc.). On the contrary, when color map information is used together, car information may be restored more accurately.

Figure 6:
FIG. 6 illustrates an original image according to an example.

FIG. 6 illustrates an original image according to an example.

Figure 7:
FIG. 7 illustrates a segmentation map of an original image according to an example.

FIG. 7 illustrates a segmentation map of an original image according to an example.

FIG. 8 illustrates a reconstructed image generated by a general image translation network according to an example.

FIG. 9 illustrates a reconstructed image generated using a color feature vector according to an example.

In FIG. 8, a first image reconstructed by a general image translation network is illustrated, and in FIG. 9, a second image reconstructed by an image translation network according to the embodiment, described above with reference to FIGS. 1 to 5, is illustrated.

Because representative color components of respective blocks are used as features, the second image may be closer to an original input image than the first image.

Figure 10:
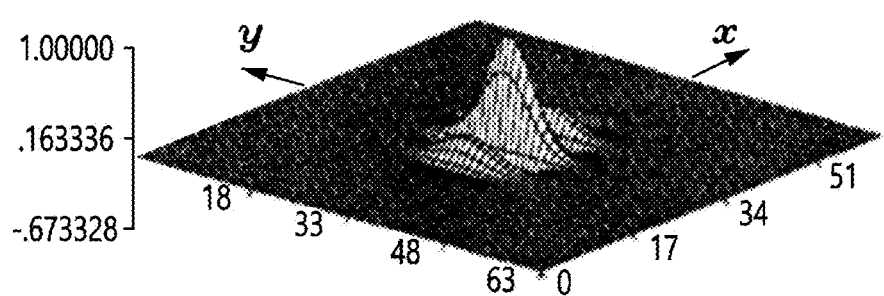
FIG. 10 illustrates the operation of a filter set according to an embodiment.

FIG. 10 illustrates the operation of a filter set according to an embodiment.

Upon generating a segmentation map, one or more pixels or pixel regions having a similar color and/or a similar texture in an image may be processed as one group.

In order to generate the segmentation map, a filter may be applied to an input image.

Through the use of the filter, one or more pixels of the input image may be classified and processed as one group based on the colors and/or textures of the one or more pixels.

Through the use of the filter, one or more pixel regions of the input image may be classified and processed as one group based on the colors and/or textures of the one or more pixel regions. Each pixel region may be a line or a block.

For example, through the use of the filter, one or more pixels or pixel regions having a similar color and/or a similar texture in the input image may be processed as one group.

The similar color may be color values falling within a specific range.

The filter set may be a 2D Gabor filter set. For example, when the segmentation map is generated, the input image may go through a 2D Gabor filter set and convolution, and values having similar energy coefficients of each filter in the Gabor filter set may be processed as a group.

Figure 11:
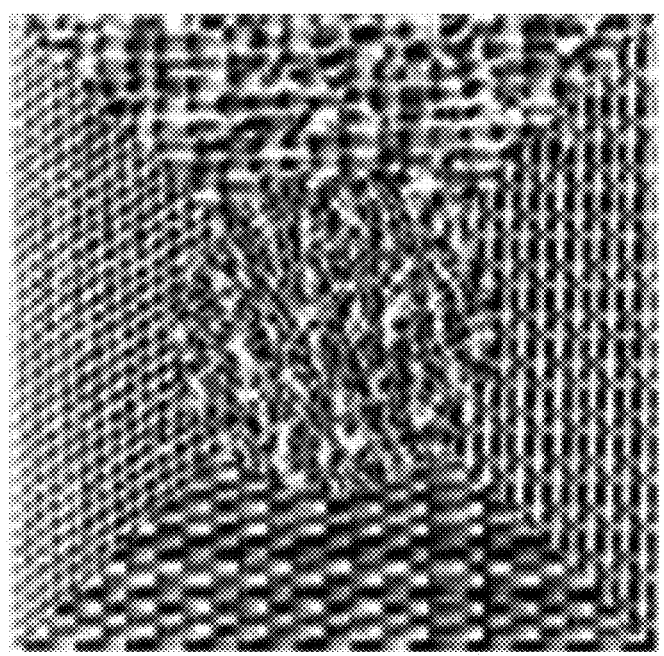
FIG. 11 illustrates colors and textures of pixels in a first image according to an example.

FIG. 11 illustrates colors and textures of pixels in a first image according to an example.

Figure 12:
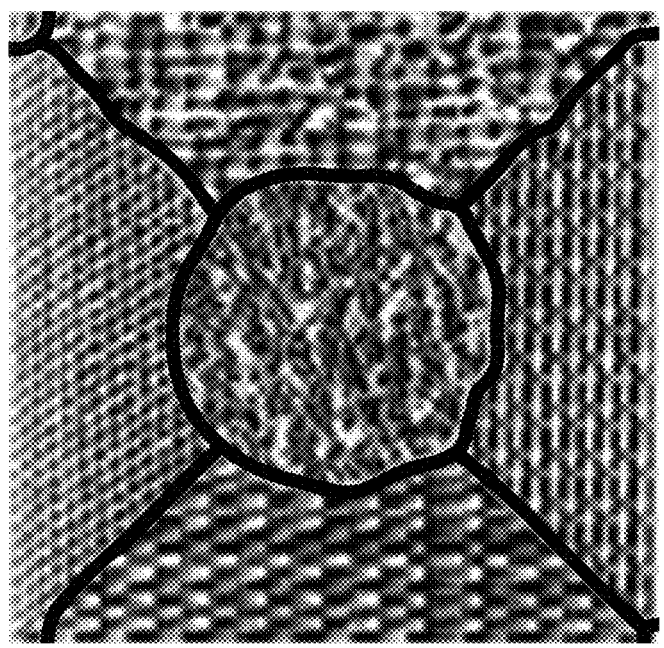
FIG. 12 illustrates groups of pixels in the first image according to an example.

FIG. 12 illustrates groups of pixels in the first image according to an example.

Figure 13:
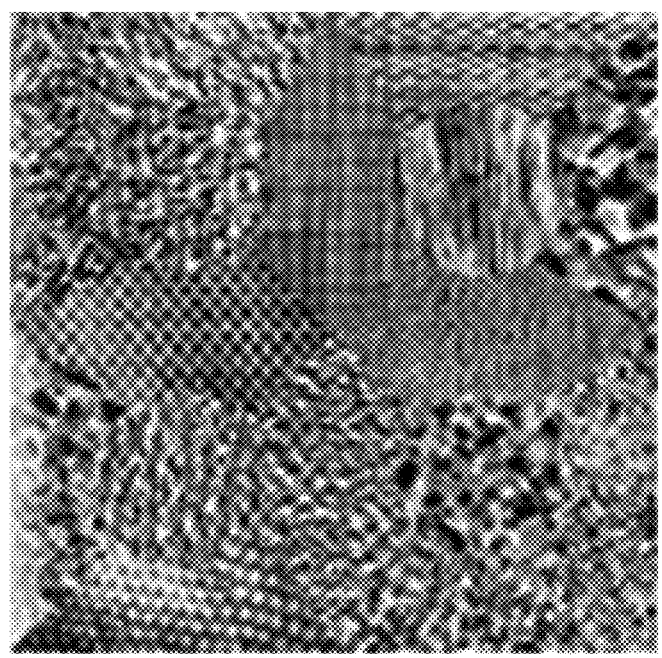
FIG. 13 illustrates colors and textures of pixels in a second image according to an example.

FIG. 13 illustrates colors and textures of pixels in a second image according to an example.

Figure 14:
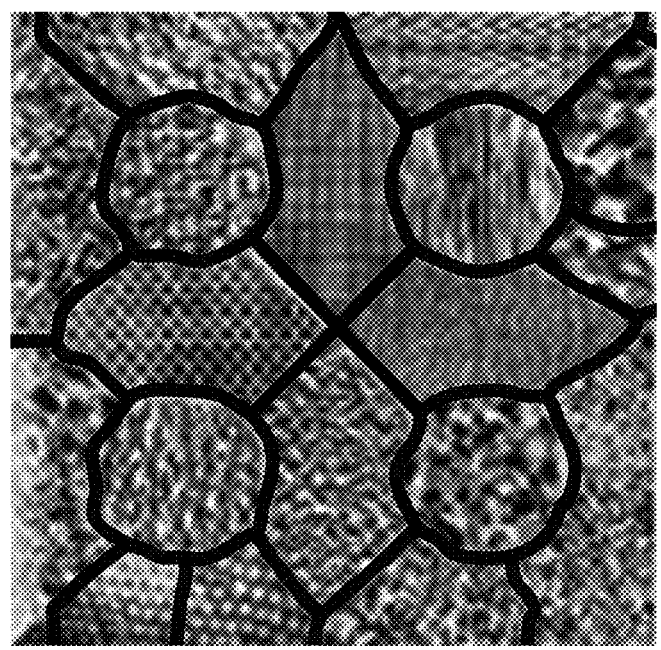
FIG. 14 illustrates groups of pixels in the second image according to an example.

FIG. 14 illustrates groups of pixels in the second image according to an example.

Figure 15:
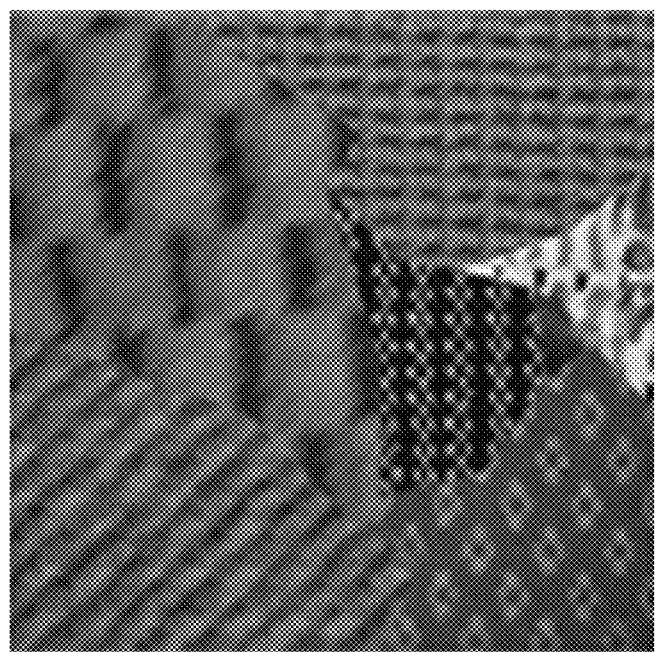
FIG. 15 illustrates colors and textures of pixels in a third image according to an example.

FIG. 15 illustrates colors and textures of pixels in a third image according to an example.

Figure 16:
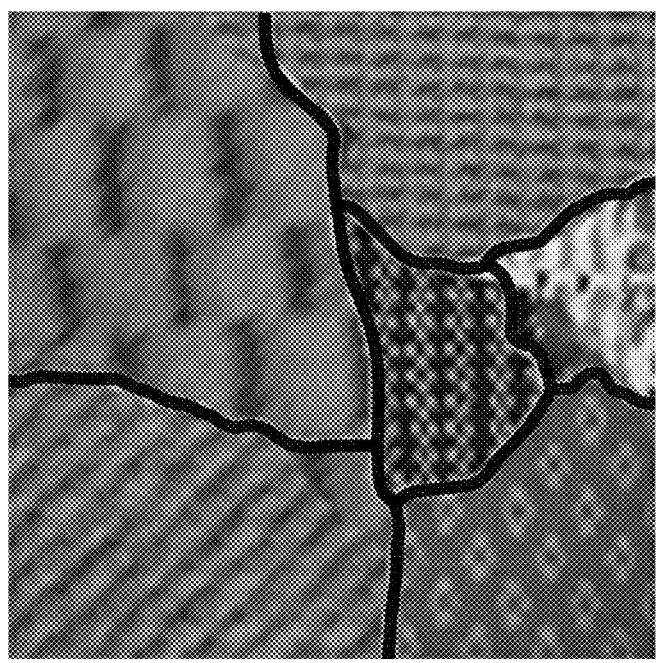
FIG. 16 illustrates groups of pixels in the third image according to an example.

FIG. 16 illustrates groups of pixels in the third image according to an example.

Figure 17:
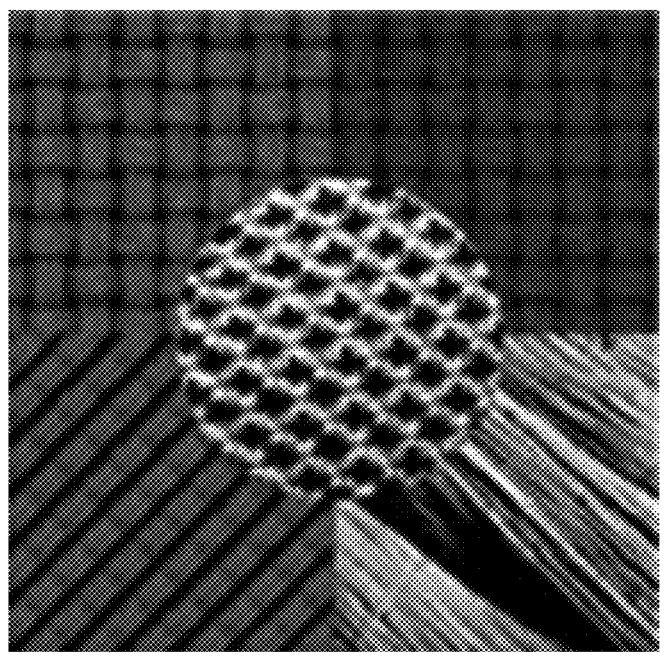
FIG. 17 illustrates colors and textures of pixels in a fourth image according to an example.

FIG. 17 illustrates colors and textures of pixels in a fourth image according to an example.

Figure 18:
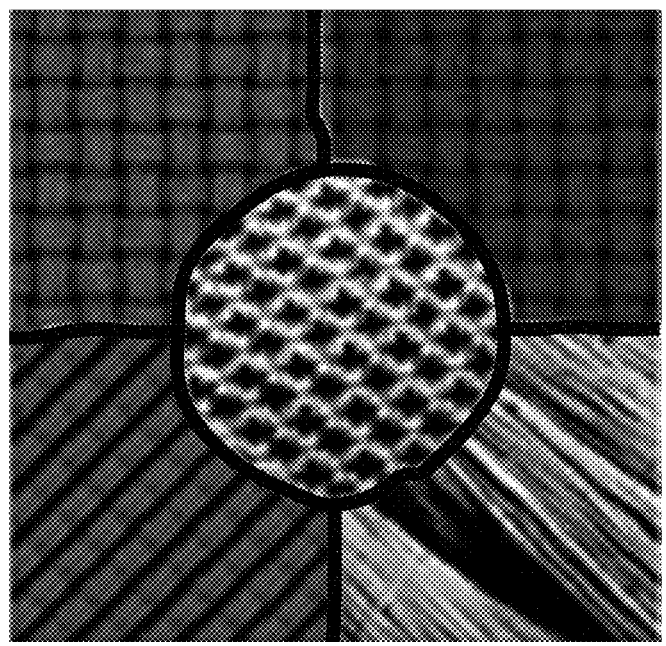
FIG. 18 illustrates groups of pixels in the fourth image according to an example.

FIG. 18 illustrates groups of pixels in the fourth image according to an example.

Figure 19:
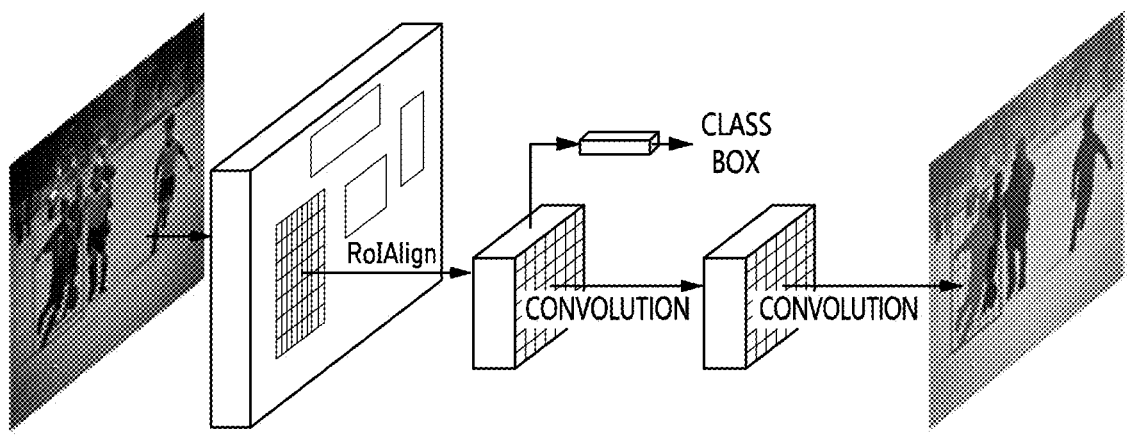
FIG. 19 illustrates the generation of a segmentation map using a Convolutional Neural Network (CNN) according to an example.

FIG. 19 illustrates the generation of a segmentation map using a Convolutional Neural Network (CNN) according to an example.

The segmentation map may be generated using a Convolutional Neural Network (CNN).

As illustrated in FIG. 19, the segmentation map may be generated using deep learning. By exploiting an image and information of a previously generated segmentation map, a deep-learning network may be trained, and segmentation may be performed on pixels in the image in units of objects having a similar meaning in the image using the trained deep-learning network.

Figure 20:
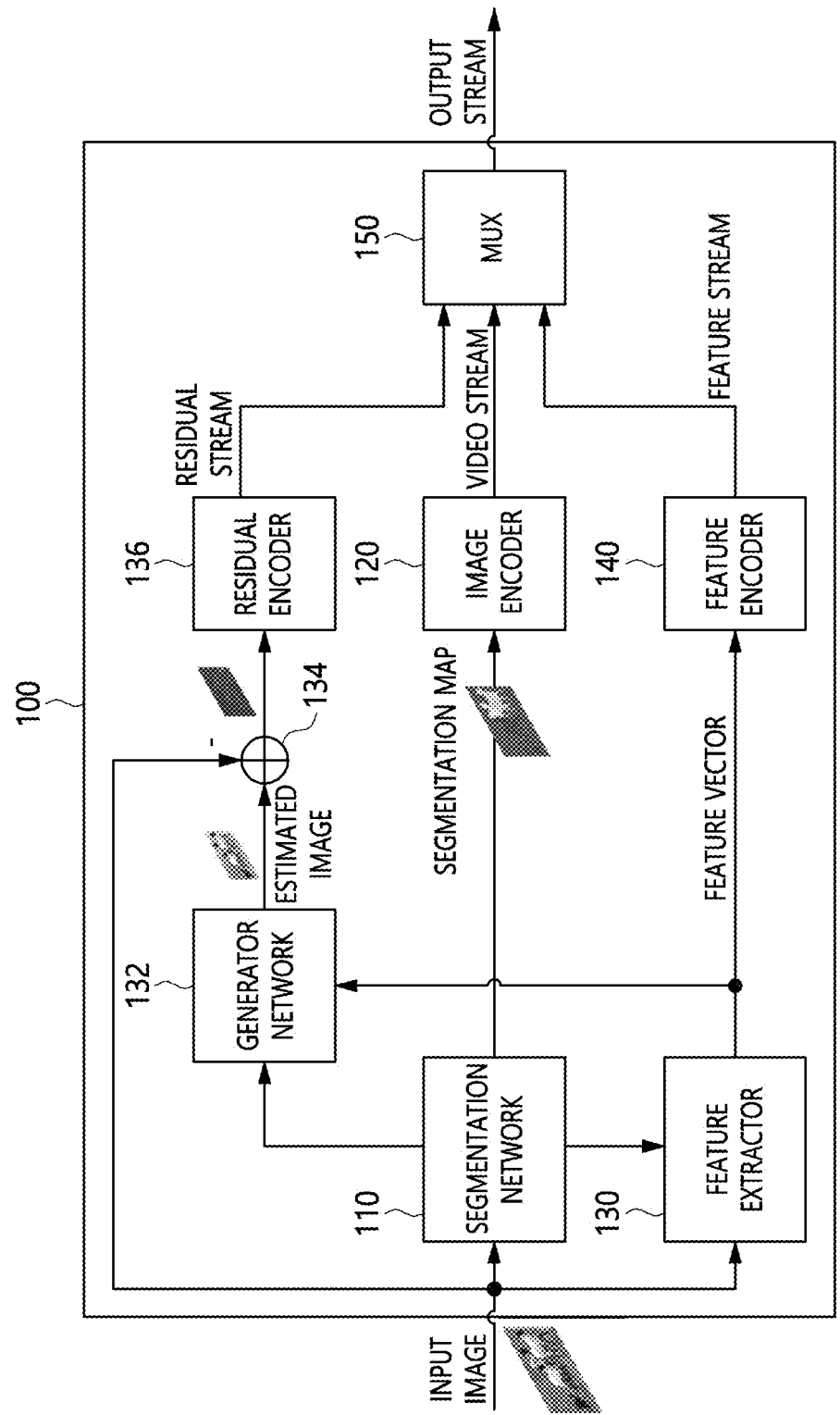
FIG. 20 illustrates the configuration of an encoding apparatus including residual transmission according to an embodiment.

FIG. 20 illustrates the configuration of an encoding apparatus including residual transmission according to an embodiment.

The encoding apparatus 100 may further include a generator network 132, a residual generator 134, and a residual encoder 136.

In FIG. 20, the name of input to a component of the encoding apparatus 100 and the name of output from a component thereof are depicted, and an image indicating the input of the encoding apparatus 100 is also depicted.

The functions and operations of components of the encoding apparatus 100 will be described in detail below with reference to FIG. 21.

Figure 21:
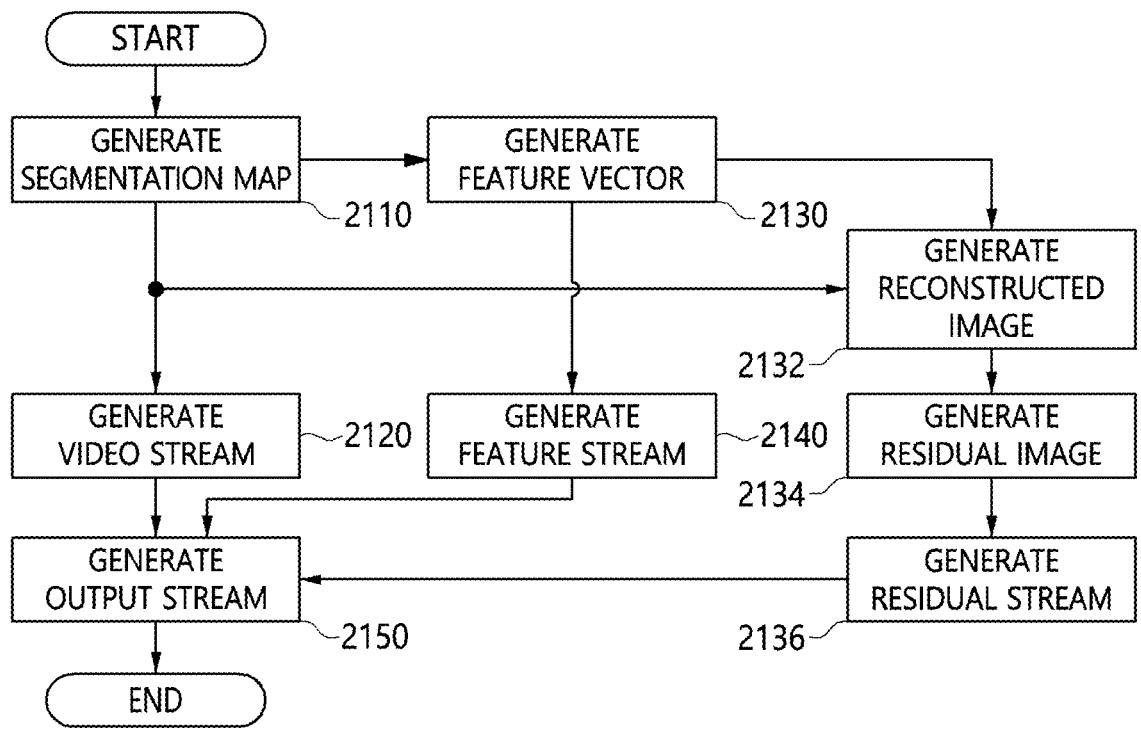
FIG. 21 is a flowchart of an encoding method using a residual according to an embodiment.

FIG. 21 is a flowchart of an encoding method using a residual according to an embodiment.

A computer-readable storage medium including a video stream, which will be described later, may be generated by the encoding method. The video stream may be a bitstream.

At step 2110, the segmentation network 110 may receive an input image of an input video. The segmentation network 110 may generate a segmentation map of the input image.

The input image may be an original image.

The segmentation map may be a region segmentation map indicating one or more regions of the input image.

The one or more regions may respectively correspond to one or more objects.

The segmentation map may be represented by an image having a two-dimensional (2D) shape.

The segmentation network 110 may generate a segmentation map image indicating the segmentation map of the input image. Hereinafter, the terms "segmentation map" and "segmentation map image" may be used to have the same meaning, and may be used interchangeably with each other.

At step 2120, the image encoder 120 may encode the segmentation map image, and may then generate an encoded segmentation map image. The image encoder 120 may generate a video stream including the encoded segmentation map image.

At step 2130, the feature extractor 130 may receive the input image of the input video.

The feature extractor 130 may receive information about the segmentation map image from the segmentation network 110.

The feature extractor 130 may extract features from at least one of the input image and the segmentation map image.

The feature extractor 130 may extract, for each of one or more objects in the segmentation map image, at least one of information about the label of the corresponding object and the feature of the object. Here, the feature of each object may include the color, texture, etc. of the corresponding object.

The feature extractor 130 may generate a feature vector using at least one of the input image and the segmentation map image.

For example, the feature vector may include one or more features for one or more objects. Alternatively, the feature vector may indicate one or more features.

For example, the identifier (ID) and the class of each object may be set. For example, the class of each object may be a sheep or a dog. At least one of the identifier and the class of the object may be set for each type of object pre-defined in the above-described encoding apparatus 100. Here, the type of the object may be an object classification criterion at a higher concept. At least one of one or more identifiers and one or more classes may be defined for one type. Also, ranges of values that identifiers of pre-defined types may have may be the same or different. For example, 0 to m identifiers may be defined for a first type and a second type, and 0 to n identifiers may be defined for a third type. Through these definitions, even when objects have the same identifier, it may be possible to identify an object in consideration of a type of the object.

For example, the features may include 1) position(s), 2) shape(s) (e.g. contour, etc), 3) texture(s) (e.g., head, tail, etc.), and 4) a color set (e.g., white, black, brown, RGB (255,0,0), etc.).

At step 2132, the generator network 132 may generate a primary reconstructed image.

The primary reconstructed image may be an estimated image of the input image. In other words, the primary reconstructed image may be an image estimated to be reconstructed by a decoding apparatus 300.

Here, the primary reconstructed image may correspond to the reconstructed image output from the generator network 340, described above with reference to FIG. 4. Alternatively, the generator network 132 may correspond to the generator network 340, described above with reference to FIG. 3.

In other words, the generator network 132 may generate the primary reconstructed image in the same manner as when the reconstructed image is configured by the decoding apparatus 300 using the segmentation map image generated by the segmentation network 110 and the feature vector extracted by the feature extractor 130.

The generator network 132 may generate the primary reconstructed image using the segmentation map image and the feature vector.

The generator network 132 may perform an image translation method based on deep learning. The generator network 132 may be an image translation network.

The generator network 132 may be a network for providing output generated based on the feature vector by utilizing the feature vector (or a feature vector represented by an image) as the input of an image translation method based on deep learning.

The generator network 132 may generate an estimated video including the primary reconstructed image.

At step 2134, the residual generator 134 may generate a residual image between the primary reconstructed image and the input image.

The residual generator 134 may calculate the difference between the primary reconstructed image and the input image, and may generate the residual image indicating the difference.

At step 2136, the residual encoder 136 may encode the residual image, and may then generate an encoded residual image.

The residual encoder 136 may be the same as an image encoding apparatus for a normal 2D image. The residual encoder 136 may include some module of the image encoding apparatus, such as an entropy coding module.

The residual encoder 136 may generate a residual stream including the encoded residual image.

At step 2140, the feature encoder 140 may encode the feature vector, and may then generate an encoded feature vector. The feature encoder 140 may generate a feature stream including the encoded feature vector.

The feature vector may be represented by a small amount of data such as metadata and a thumbnail image.

At step 2150, the MUX 150 may generate an output stream by performing multiplexing on the residual stream, the video stream, and the feature stream.

In an embodiment, the image may be a plurality of images. At least one of the above-described segmentation map image, encoded segmentation map image, feature, feature vector, encoded feature vector, residual image, and encoded residual image may be generated for each of the plurality of images. Alternatively, at least of the above-described segmentation map image, the encoded segmentation map image, the feature, the feature vector, the encoded feature vector, the residual image, and the encoded residual image may be generated only for some of the plurality of images, and may be skipped or be shared for remaining images.

The video stream may include a plurality of encoded segmentation map images for the plurality of images. The feature stream may include encoded feature vectors for the plurality of images. The residual stream may include encoded residual images for the plurality of images.

Through the above-described method, by primarily transmitting the segmentation map and the feature vector, functions basically required by a machine-vision application, such as classification of objects, recognition of objects, and measurement of objects, may be performed using a large amount of data. Further, through the reconstruction of images, a person may also perceive (view) results (i.e., a reconstructed image).

Figure 22:
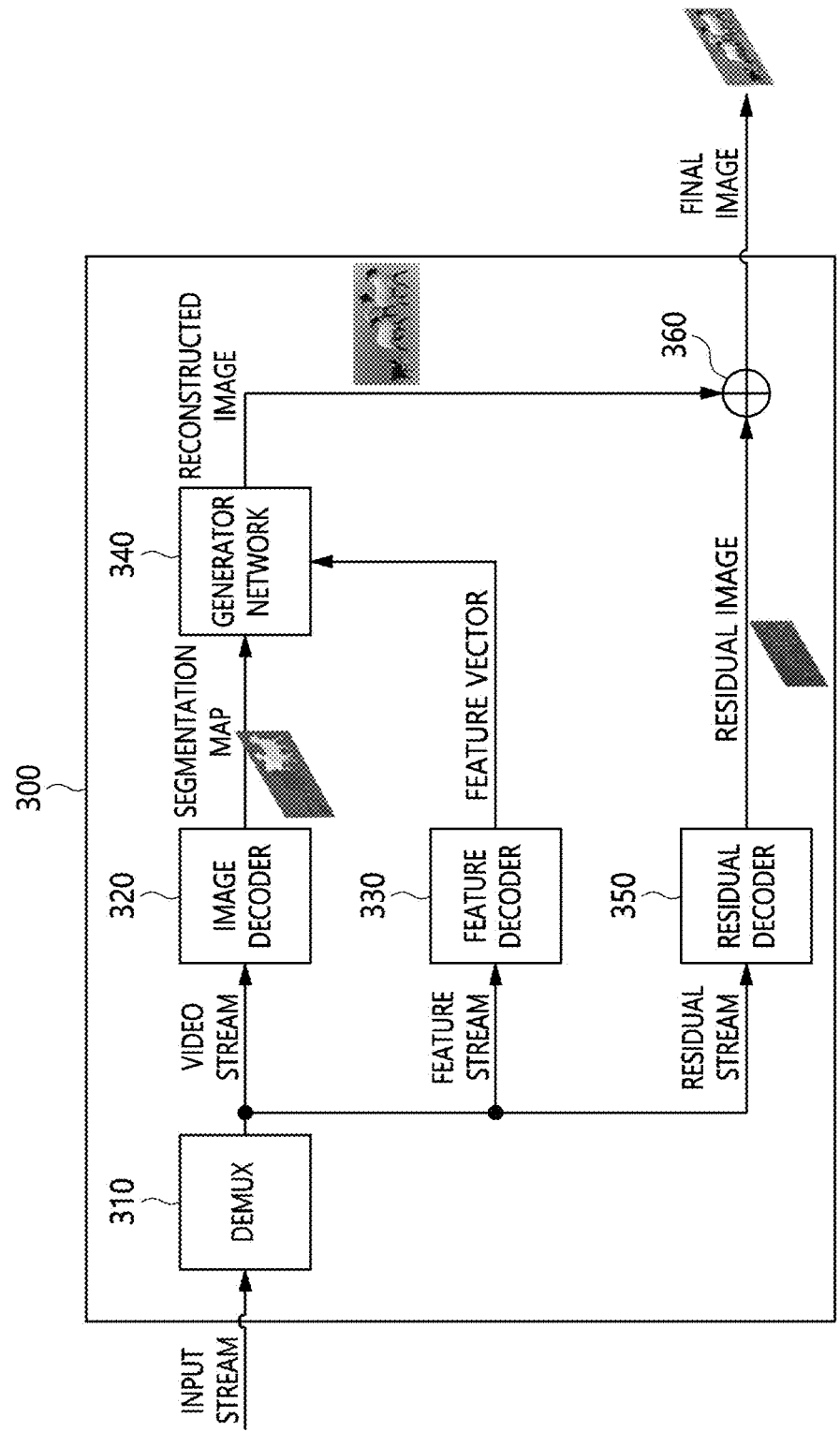
FIG. 22 illustrates the configuration of a decoding apparatus using residual reception according to an embodiment.

FIG. 22 illustrates the configuration of a decoding apparatus including residual reception according to an embodiment.

The decoding apparatus 300 may further include a residual decoder 350 and a combiner 360.

In FIG. 22, the name of input to the component of the decoding apparatus 300 and the name of output from the component thereof are depicted, and an image indicating the output of the decoding apparatus 300 is depicted.

The functions and operations of components of the decoding apparatus 300 will be described in detail below with reference to FIG. 23.

Figure 23:
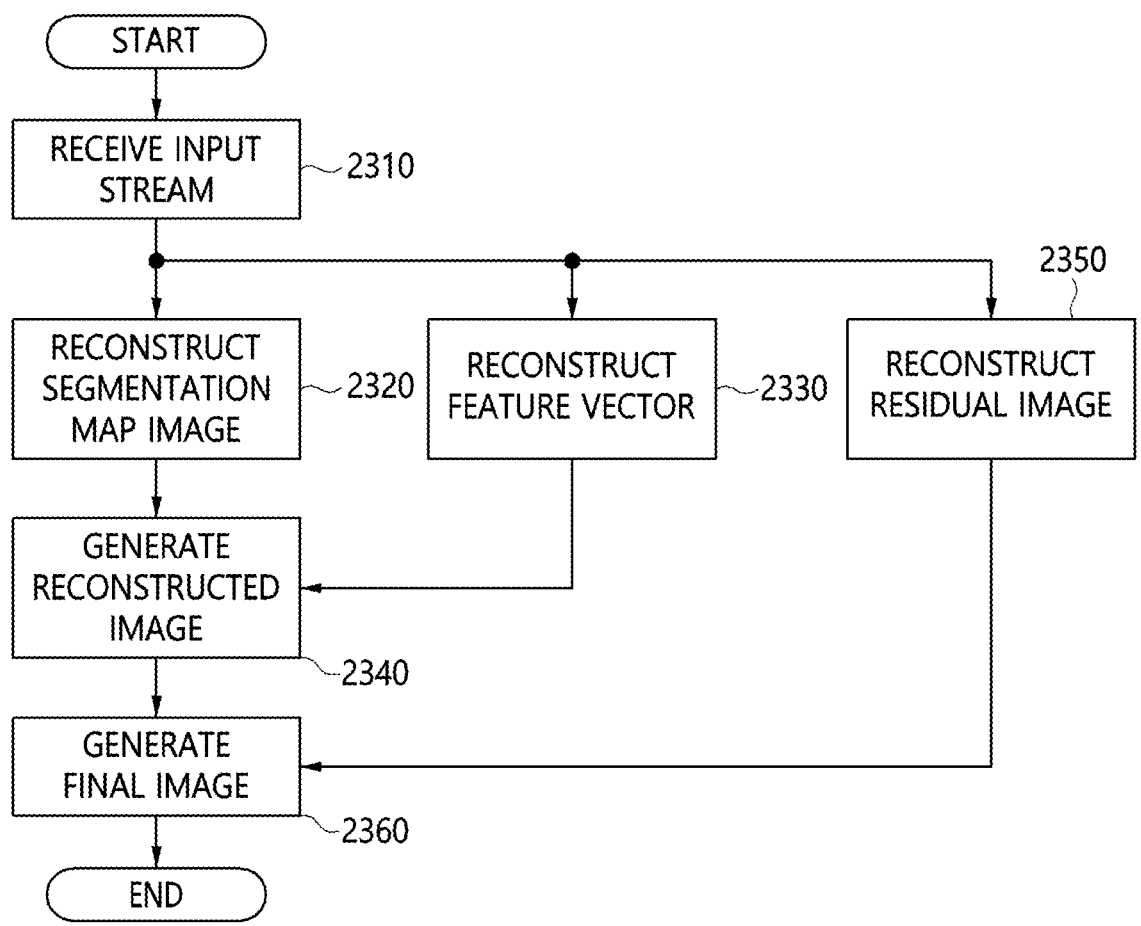
FIG. 23 is a flowchart of a decoding method using a residual according to an embodiment.

FIG. 23 is a flowchart of a decoding method using a residual according to an embodiment.

At step 2310, the DEMUX 310 may receive an input stream. The input stream may be defined as a single stream that is a combination of a video stream, a feature stream and a residual stream. Alternatively, at least one of the video stream, the feature stream and the residual stream may be received separately.

The input stream may be an output stream provided from the encoding apparatus 100, described above with reference to step 2150.

The DEMUX 310 may separate a video stream, a feature stream, and a residual stream from the input stream by performing demultiplexing on the input stream, and may output the video stream, the feature stream, and the residual stream from the input stream.

The video stream may be input to the image decoder 320 corresponding to the image encoder 120 of the encoding apparatus 100.

The feature stream may be input to the feature decoder 330 corresponding to the feature encoder 140 of the encoding apparatus 100.

The residual stream may be input to the residual decoder 350 corresponding to the residual encoder 136 of the encoding apparatus 100.

At step 2320, the image decoder 320 may decode an encoded segmentation map image of the video stream, and may then reconstruct a segmentation map image.

At step 2330, the feature decoder 330 may decode an encoded feature vector of the feature stream, and may then reconstruct a feature vector.

The (reconstructed) segmentation map image and the (reconstructed) feature vector may be input to the generator network 340.

At step 2340, the generator network 340 may generate a reconstructed image using the (reconstructed) segmentation map image and the (reconstructed) feature vector.

Information about the label of each object in the (reconstructed) segmentation map image and the feature of the object may be extracted, and the feature may include the color of the object, the texture of the object, etc.

The reconstructed image may be input to the combiner 360.

The generator network 340 may perform an image translation method based on deep learning. The generator network 340 may be an image translation network.

The generator network 340 may be a network for providing output generated based on the feature vector by utilizing the feature vector (or a feature vector represented by an image) as the input of an image translation method based on deep learning.

At step 2350, the residual decoder 350 may decode an encoded residual image of the residual stream, and may then reconstruct a residual image.

The (reconstructed) residual image may be input to the combiner 360.

At step 2360, the combiner 360 may generate a final image using the reconstructed image and the residual image.

The combiner 360 may generate a final image by combing the reconstructed image and the residual image. For example, the combiner 360 may generate the final image by adding the reconstructed image to the residual image.

In accordance with an embodiment, a result closer to the original image may be acquired, and a high-quality image that can be perceived by a person while satisfying the performance required for a machine vision may be provided.

In an embodiment, for a machine-vision application such as for object recognition, a segmentation map of an input image may be encoded, and an encoded segmentation map may be transmitted. The encoded image may be decoded such that the reconstructed image has original cognitive information in relation by utilizing the segmentation map.

In relation to these methods, the embodiments may transmit a specific number of features, such as object-based or block-based color texture, so as to improve reconstruction performance of the segmentation map.

In embodiments, an image reconstructed through the segmentation map may be provided with original cognitive information, and a specific number of features may be used to generate the reconstructed image.

The above embodiments may be performed by the encoding apparatus 100 and by the decoding apparatus 300 using the same method and/or the corresponding method. Also, a combination of one or more of the above-described embodiments may be used to encode and/or decode an image.

The order of application of the embodiments may differ from each other in the encoding apparatus 100 and the decoding apparatus 300. Alternatively, the order of application of the embodiments may be (at least partially) identical to each other in the encoding apparatus 100 and the decoding apparatus 300.

The above-described embodiments may be performed on each of a luma signal and a chroma signal. The above-described embodiments may be equally performed on the luma signal and the chroma signal.

The form of the block to which the foregoing embodiments are applied may have a square or non-square shape.

In the above-described embodiments, it may be construed that, when specified processing is applied to a specified target, specified conditions may be required. Also, it may be construed that, when a description is made such that the specified processing is performed under a specified decision, whether the specified conditions are satisfied may be determined based on a specified coding parameter and that, alternatively, when a description is made such that a specified decision is made based on a specified coding parameter, the specified coding parameter may be replaced with an additional coding parameter. In other words, it may be considered that a coding parameter that influences the specified condition or the specified decision is merely exemplary, and it may be understood that, in addition to the specified coding parameter, a combination of one or more other coding parameters may function as the specified coding parameter.

In the above-described embodiments, although the methods have been described based on flowcharts as a series of steps or units, the present disclosure is not limited to the sequence of the steps and some steps may be performed in a sequence different from that of the described steps or simultaneously with other steps. Further, those skilled in the art will understand that the steps shown in the flowchart are not exclusive and may further include other steps, or that one or more steps in the flowchart may be deleted without departing from the scope of the disclosure.

The above-described embodiments include various aspects of examples. Although not all possible combinations for indicating various aspects can be described, those skilled in the art will recognize that additional combinations other than the explicitly described combinations are possible. Therefore, it may be appreciated that the present disclosure includes all other replacements, changes, and modifications belonging to the accompanying claims.

The above-described embodiments according to the present disclosure may be implemented as a program that can be executed by various computer means and may be recorded on a computer-readable storage medium. The computer-readable storage medium may include program instructions, data files, and data structures, either solely or in combination. Program instructions recorded on the storage medium may have been specially designed and configured for the present disclosure, or may be known to or available to those who have ordinary knowledge in the field of computer software.

The computer-readable storage medium may include information used in embodiments according to the present disclosure. For example, the computer-readable storage medium may include a bitstream, which may include various types of information described in the embodiments of the present disclosure.

The computer-readable storage medium may include a non-transitory computer-readable medium.

Examples of the computer-readable storage medium include all types of hardware devices specially configured to record and execute program instructions, such as magnetic media, such as a hard disk, a floppy disk, and magnetic tape, optical media, such as compact disk (CD)-ROM and a digital versatile disk (DVD), magneto-optical media, such as a floptical disk, ROM, RAM, and flash memory. Examples of the program instructions include machine code, such as code created by a compiler, and high-level language code executable by a computer using an interpreter. The hardware devices may be configured to operate as one or more software modules in order to perform the operation of the present disclosure, and vice versa.

There are provided an apparatus, a method, and a storage medium that perform encoding and/or decoding on an image using a segmentation map.

There are provided an apparatus, a method, and a storage medium that perform encoding and/or decoding on an image using feature information generated based on a segmentation map.

There are provided an apparatus, a method, and a storage medium that perform encoding and/or decoding on an image using a residual image between a reconstructed image and an input image.

As described above, although the present disclosure has been described based on specific details such as detailed components and a limited number of embodiments and drawings, those are merely provided for easy understanding of the entire disclosure, the present disclosure is not limited to those embodiments, and those skilled in the art will practice various changes and modifications from the above description.

Accordingly, it should be noted that the spirit of the present embodiments is not limited to the above-described embodiments, and the accompanying claims and equivalents and modifications thereof fall within the scope of the present disclosure.

What is claimed is:

1. An encoding method, comprising:
   generating a segmentation map image indicating a segmentation map of an input image
   generating a video stream including an encoded segmentation map image;
   generating a feature vector using the input image and the segmentation map image;
   generating a feature stream including an encoded feature vector;
   generating a reconstructed image using the segmentation map image and the feature vector;
   generating a residual image between the reconstructed image and the input image;
   generating an encoded residual image by encoding the residual image; and
   generating an output stream by performing multiplexing on the video stream and the feature stream,
   wherein the encoded segmentation map image is generated by encoding the segmentation map image,
   wherein the encoded feature vector is generated by encoding the feature vector,
   wherein the output stream includes a residual stream, and
   wherein the residual stream includes the encoded residual image.

2. The encoding method of claim 1, wherein the segmentation map is a region segmentation map indicating one or more regions of the input image.

3. The encoding method of claim 1, wherein information about a label of each object in the segmentation map image and a feature of the object are extracted.

4. The encoding method of claim 3, wherein the feature includes color and/or texture information of the object.

5. The encoding method of claim 3, wherein:
   the feature of the object includes one or more blocks,
   each of the one or more blocks includes position and color set, and
   the color set is representative color components of the corresponding block.

6. The encoding method of claim 1, wherein:
   the feature vector includes color map information, and
   the color map information includes pieces of color information of each of one or more objects in the input image.

7. The encoding method of claim 6, wherein the pieces of color information are pieces of color information of one or more blocks forming each object in the input image.

8. The encoding method of claim 1, wherein a filter is applied to the input image to generate the segmentation map.

9. A non-transitory computer-readable storage medium, comprising:
   a bitstream generated by the encoding method of claim 1.

10. A decoding method, comprising:
    receiving an input stream;
    separating a video stream and a feature stream from the input stream by performing demultiplexing on the input stream,
    generating a segmentation map image;
    generating a feature vector;
    generating a reconstructed image using the segmentation map image and the feature vector; and
    generating a final image using the reconstructed image and a residual image,
    wherein the video stream includes an encoded segmentation map image,
    wherein the feature stream includes an encoded feature vector,
    wherein the segmentation map image is reconstructed by decoding the encoded segmentation map image,
    wherein the feature vector is reconstructed by decoding the encoded feature vector,
    wherein a residual stream is output from the input stream, and
    wherein the residual image is reconstructed by decoding an encoded residual image of the residual stream.

11. The decoding method of claim 10, wherein the reconstructed image is generated by a generator network for performing an image translation method based on deep learning.

12. The decoding method of claim 10, wherein information about a label of each object in the segmentation map image and a feature of the object are extracted.

13. The decoding method of claim 12, wherein the feature includes color and/or texture information of the object.

14. A non-transitory computer-readable storage medium storing a bitstream for image decoding, wherein the bitstream comprises:
an input stream,
   wherein the input stream comprises a video stream, a feature stream and a residual stream,
   wherein the video stream and the feature stream are separated from the input stream by performing demultiplexing on the input stream,
   wherein a segmentation map image is generated using the video stream,
   wherein the video stream includes an encoded segmentation map image,
   wherein the segmentation map image is reconstructed by decoding the encoded segmentation map image,
   wherein a feature vector is generated using the feature stream,
   wherein the feature stream includes an encoded feature vector,
   wherein the feature vector is reconstructed by decoding the encoded feature vector,
   wherein a reconstructed image is generated using the segmentation map image and the feature stream,
   wherein a residual image is reconstructed by decoding an encoded residual image of the residual stream, and
   wherein a final image is generated using the reconstructed image and the residual image.

* * * * *